(12) United States Patent
Kanazawa et al.

(10) Patent No.: US 12,444,902 B2
(45) Date of Patent: Oct. 14, 2025

(54) OPTICAL TRANSMITTER

(71) Applicant: Nippon Telegraph and Telephone Corporation, Tokyo (JP)

(72) Inventors: Shigeru Kanazawa, Musashino (JP); Takahiko Shindo, Musashino (JP); Naoki Fujiwara, Musashino (JP)

(73) Assignee: NTT, INC., Tokyo (JP)

( * ) Notice: Subject to any disclaimer, the term of this patent is extended or adjusted under 35 U.S.C. 154(b) by 897 days.

(21) Appl. No.: 17/428,059

(22) PCT Filed: Jan. 24, 2020

(86) PCT No.: PCT/JP2020/002453
§ 371 (c)(1),
(2) Date: Aug. 3, 2021

(87) PCT Pub. No.: WO2020/162217
PCT Pub. Date: Aug. 13, 2020

(65) Prior Publication Data
US 2022/0149591 A1 May 12, 2022

(30) Foreign Application Priority Data
Feb. 6, 2019 (JP) .................................. 2019-019720

(51) Int. Cl.
*H01S 5/02325* (2021.01)
*H01S 5/02345* (2021.01)
(Continued)

(52) U.S. Cl.
CPC ...... *H01S 5/02325* (2021.01); *H01S 5/02345* (2021.01); *H01S 5/0239* (2021.01);
(Continued)

(58) Field of Classification Search
CPC .. H01S 5/02325; H01S 5/0239; H01S 5/0265; H01S 5/02326
See application file for complete search history.

(56) References Cited

U.S. PATENT DOCUMENTS 5,602,672 A * 2/1997 Ishimura ............... G02F 1/0121
359/245
5,781,578 A 7/1998 Takagi
(Continued)

OTHER PUBLICATIONS

European Search Report dated Oct. 6, 2022, issued in EP Application No. 20752773.0.
(Continued)

*Primary Examiner* — Sean P Hagan
(74) *Attorney, Agent, or Firm* — Workman Nydegger (57) ABSTRACT

An optical transmitter capable of significantly suppressing a fluctuation in frequency response characteristics due to a fabrication error in internal wire length while reducing a subcarrier size of a module of the optical transmitter is provided. The optical transmitter includes a subcarrier on which an RF wiring board, a modulated laser chip, and a terminating resistor are mounted. A ground pad is on an upper surface of the subcarrier. A wire electrically connects at least the RF wiring board and the modulated laser chip to each other. The RF wiring board and the modulated laser chip are arranged in a width direction of the subcarrier. A length of the wire in an electric path which starts at the RF wiring board, passes through the terminating resistor, and reaches the ground pad is 0.5 to 1.5 mm or has an inductance of 0.4 to 1.2 nH.

4 Claims, 6 Drawing Sheets

(51) Int. Cl.
*H01S 5/0239* (2021.01)
*H01S 5/026* (2006.01)
*H01S 5/062* (2006.01)
*H01S 5/10* (2021.01)
*H04B 10/50* (2013.01)
*H01S 5/12* (2021.01)

(52) U.S. Cl.
CPC ........ *H01S 5/06226* (2013.01); *H01S 5/1085* (2013.01); *H01S 5/0265* (2013.01); *H01S 5/101* (2013.01); *H01S 5/12* (2013.01); *H04B 10/503* (2013.01)

(56) References Cited

U.S. PATENT DOCUMENTS

| | | | | |
|---|---|---|---|---|
| 6,437,899 | B1* | 8/2002 | Noda | G02F 1/025 |
| | | | | 359/245 |
| 6,567,439 | B1* | 5/2003 | Auracher | H01S 5/02253 |
| | | | | 372/36 |
| 2001/0038146 | A1 | 11/2001 | Shimizu | |
| 2005/0052721 | A1* | 3/2005 | Guan | G02F 1/0121 |
| | | | | 359/245 |
| 2006/0007516 | A1 | 1/2006 | Kagaya et al. | |
| 2006/0008194 | A1* | 1/2006 | Kagaya | G02F 1/0121 |
| | | | | 385/1 |
| 2007/0248363 | A1 | 10/2007 | Kagaya | |
| 2009/0003396 | A1 | 1/2009 | Cadato et al. | |
| 2010/0254665 | A1* | 10/2010 | Kubota | G02B 6/4204 |
| | | | | 385/88 |
| 2013/0010343 | A1* | 1/2013 | Hirayama | G02F 1/0121 |
| | | | | 359/238 |
| 2018/0275434 | A1 | 9/2018 | Tanaka | |

OTHER PUBLICATIONS

Mizuki Shirao et al. "A Cost Effective TO-CAN Packaged 10 Gbps EML Module Employing Inductance Compensation Technique" 2013 IEEE.

C. Kazmierski, et al., *100 GB/s Operation of an AlGaInAs Semi-Insulating Buried Heterojunction EML*, Proc OFC2009 OThT7, 2009, pp. 3.

* cited by examiner

OPTICAL TRANSMITTER

TECHNICAL FIELD

The present invention relates to an optical transmitter constituted by a semiconductor laser-mounted module.

BACKGROUND ART

Figure 1:
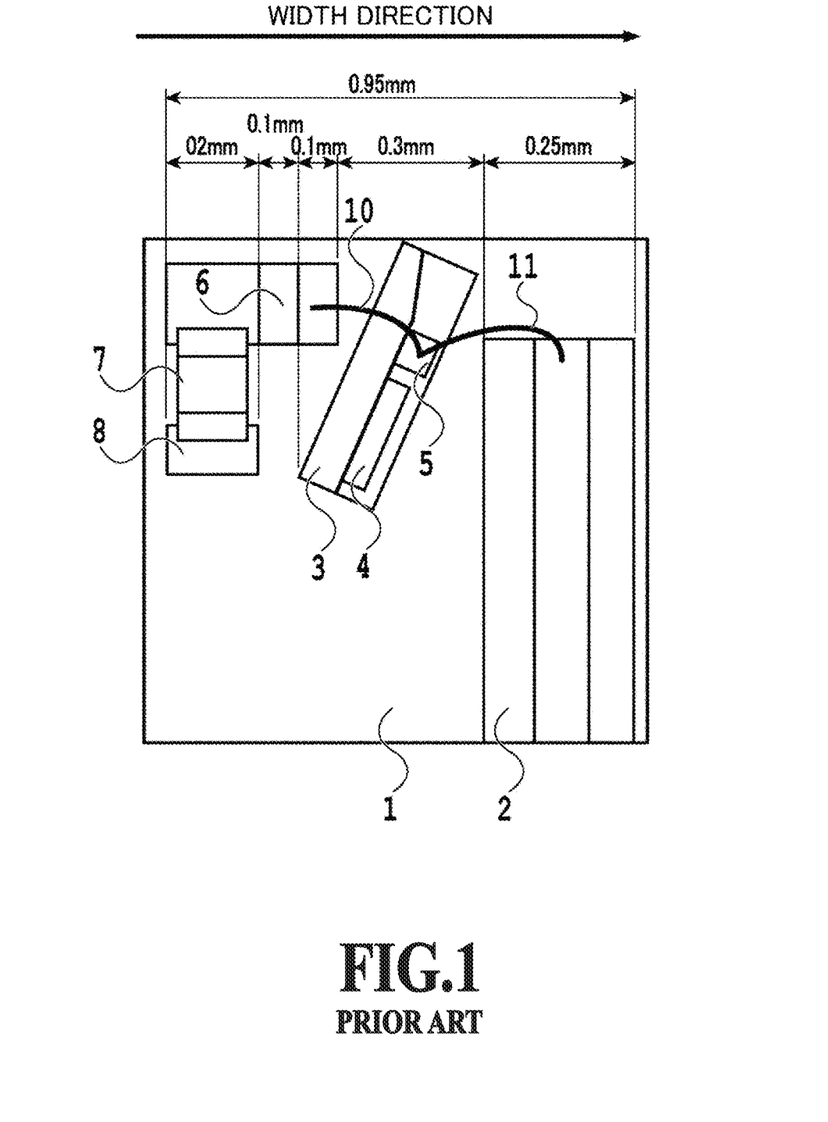
FIG. 1 is a plan view of a module of a conventional optical transmitter.

Conventionally, an optical transmitter used in optical communications and the like is constituted by an EA-DFB laser-mounted module such as that shown in FIG. 1. In the EA-DFB laser-mounted module shown in FIG. 1, an RF wiring board 2, an EA-DFB laser chip 3 including a DFB laser 4 and an EA modulator 5, a terminating resistor 6, and a capacitor 7 are arranged on a subcarrier 1 from the right in the diagram in a width direction (a direction of a short side that is orthogonal to a light-outgoing direction) of the subcarrier 1. In addition, an upper end of an RF wiring on the RF wiring board 2 and an electrode of the EA modulator 5 on the EA-DFB laser chip 3 are electrically connected by a wire 11, and the electrode of the EA modulator 5 and the terminating resistor 6 are electrically connected by a wire 10.

In the conventional optical transmitter shown in FIG. 1, a modulated electric signal input from a lower end of the RF wiring of the RF wiring board 2 is supplied from the upper end of the RF wiring of the RF wiring board 2 to the electrode of the EA modulator 5 via the wire 11 and further connected to an electrode at one end of the terminating resistor 6 by the wire 10 via the electrode of the EA modulator 5. Another end of the terminating resistor 6 is connected to one end of the capacitor 7 for DC interruption (DC cut) via an electrode and connected to and grounded by a ground pad 8 to be a ground electrode at another end of the capacitor 7. As shown in FIG. 1, a conventional optical transmitter requires a width of around 0.95 mm as a size of the subcarrier 1.

In addition, an optical waveguide of the EA-DFB laser chip 3 is formed as a bent waveguide as a measure against return light, and a portion of an output optical waveguide is structured to emit light at a non-90 degree angle with respect to a light-outgoing end surface of the EA-DFB laser chip 3. In order to align a direction of outgoing light in a longitudinal direction of the subcarrier 1, the EA-DFB laser chip 3 itself is arranged at an oblique angle in an orientation that enables a side of the subcarrier 1 in the longitudinal direction and outgoing light to be parallel to each other.

In addition, while the EA-DFB laser chip 3 including the DFB laser 4 and the EA modulator 5 has been exemplified as a laser chip, the laser chip is not limited thereto and may be a modulated laser chip of any type with a modulation function.

CITATION LIST

Non Patent Literature

[NPL 1] C. Kazmierski, A. Konczykowska, F. Jorge, F. Blache, M. Riet, C. Jany, A. Scavennec, "100 Gb/s Operation of an AlGaInAs Semi-Insulating Buried Heterojunction EML", Proc OFC2009 OThT7

SUMMARY OF THE INVENTION

Technical Problem

In the conventional optical transmitter shown in FIG. 1, since a portion of the wire 10 that connects the EA modulator 5 and the terminating resistor 6 to each other has parasitic inductance (parasitic inductance) in accordance with a length of the wire 10, an effect of adjusting a peaking amount of frequency response characteristics of the optical transmitter is produced. In conventional configurations, there is a problem in that, while a wire length is around 0.2 to 0.3 mm, a fluctuation in peaking in the frequency response characteristics of the optical transmitter that is attributable to fabrication error in the wire length in this case creates a variation in a 3 dB band frequency where gain drops by 3 dB in the frequency response characteristics.

There is another problem in that, when extending the wire length in order to alleviate the variation and arranging the terminating resistor 6 at a position separated from the EA-DFB laser chip 3, a size of the subcarrier 1 increases.

In addition, another problem of the conventional configuration shown in FIG. 1 is that, since respective parts are generally mounted side by side in a width direction of the subcarrier, a width of the subcarrier increases.

The present invention has been made in consideration of the problems described above and an object thereof is to provide an optical transmitter capable of significantly suppressing a fluctuation in frequency response characteristics due to a fabrication error in internal wire length while reducing a subcarrier size of a module of the optical transmitter.

Means for Solving the Problem

In order to achieve the object described above, the present invention characteristically includes the following configurations.

(Configuration 1)

An optical transmitter, including: a subcarrier on which an RF wiring board with wires, a modulated laser chip, and a terminating resistor are mounted and which has a ground pad on an upper surface thereof; the wires for electrically connecting at least a part of an electric path which starts at the RF wiring board, passes through the terminating resistor, and reaches the ground pad, wherein an output optical waveguide of the modulated laser chip emits light at an angle of not 90 degrees to an emitting face of the modulated laser chip, the RF wiring board and the ground ad are arranged to sandwich the modulated laser chip in the width direction of the subcarrier, the termination resistor is a termination of the RF wiring and integrated on the RF wiring board and a width of the terminating resistor is approximately the same as a width of an RF wiring on the RF wiring board, and a length of the wires in the electric path to the ground pad ranges from 0.5 to 1.5 mm or an inductance of the wires ranges from 0.4 to 1.2 nH.

(Configuration 2)

An optical transmitter including: a subcarrier, an RF wiring board mounted on the subcarrier, a modulated laser chip mounted on the subcarrier, a terminating resistor mounted on the subcarrier, a ground pad on an upper surface of the subcarrier, and a wire for electrically connecting at least a part of an electric path from the RF wiring board, reaching the ground pad through the terminating resistor, wherein an output optical waveguide of the modulated laser chip emits light at an angle of not 90 degrees to the emitting end face of the modulated laser chip, the terminating resistor is integrated on the subcarrier with the RF wiring board and the termination resistor are arranged to sandwich the modulated laser chip in the width direction of the subcarrier, the ground pad being in an upper corner of the subcarrier on the same side of the modulated laser chip as the RF wiring board, and a length of the wires in the electric path to the ground pad ranges from 0.5 to 1.5 mm or an inductance of the wire ranges from 0.4 to 1.2 nH.
(Configuration 3)

The optical transmitter according to configuration 1 or configuration 2, wherein at least one capacitor is connected in series as a circuit to the electric path which starts at the RF wiring board, passes through the terminating resistor, and reaches the ground pad.
(Configuration 4)

The optical transmitter according to configuration 3, wherein the capacitor is arranged on an opposite side to the terminating resistor with the modulated laser chip therebetween.
(Configuration 5)

The optical transmitter according to configuration 1, wherein an output optical waveguide of the modulated laser chip emits light at a non-90 degree angle with respect to a light-outgoing end surface of the modulated laser chip.

Effects of the Invention

As described above, according to the present invention, an optical transmitter capable of significantly suppressing a fluctuation in frequency response characteristics due to a fabrication error in internal wire length while reducing a subcarrier size of a module of the optical transmitter can be provided.

DESCRIPTION OF EMBODIMENTS

In order to solve the problems described above, an optical transmitter according to the present invention arranges a terminating resistor, an EA-DFB laser chip, and a ground pad on a subcarrier in a width direction of the subcarrier. Studies conducted based on embodiments described hereinafter revealed that a structure such as that described below is optimal for suppressing a change in frequency response characteristics of an optical transmitter. The structure includes an inductor in which a length of a wire existing on an electric circuit which starts at the RF wiring board, passes through the terminating resistor, and reaches the ground pad ranges from around 0.5 to 1.5 mm or an inductance of the wire corresponds to a total range of 0.4 to 1.2 nH. Adopting such a structure enables a fluctuation of a 3 dB band due to a variation in a length of a wire connecting the ground pad and the terminating resistor to each other to be suppressed and enables a mounting yield to be improved. In addition, a width of the subcarrier can be reduced.

The present invention achieves stable frequency response characteristics independent of a wire length and a reduction in a width of a subcarrier by optimally designing an arrangement of each part on the subcarrier and a wire length.

Hereinafter, embodiments of the present invention will be described in detail with reference to the drawings.

First Embodiment

Figure 2:
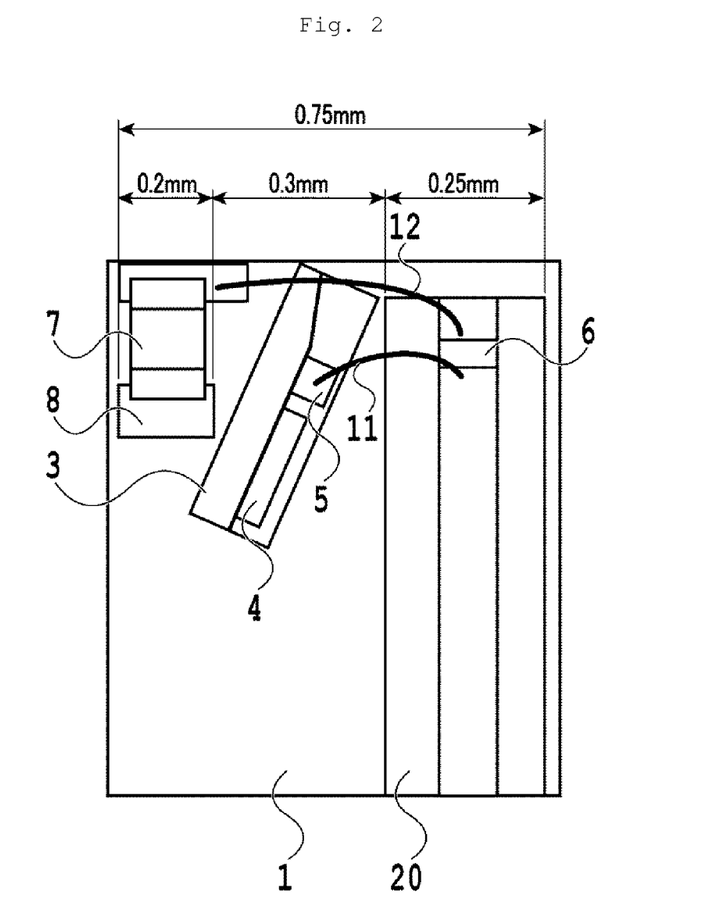
FIG. 2 is a plan view of a module of an optical transmitter according to a first embodiment of the present invention.

FIG. 2 shows a plan view of an optical transmitter according to a first embodiment of the present invention. The optical transmitter according to the first embodiment of the present invention adopts a subassembly of an optical transmitter module including, on a subcarrier 1 in a width direction of the subcarrier 1, an RF wiring board 20 that integrates a terminating resistor 6, an EA-DFB laser chip 3 having a bent waveguide of approximately 5 degrees, and a capacitor 7 connected to a ground pad 8.

In the optical transmitter according to the first embodiment shown in FIG. 2, the terminating resistor 6 with a width that is more or less the same as a width of an RF wiring is integrated at a termination of the RF wiring on the RF wiring board 20 and a width of the subcarrier 1 can be conserved accordingly.

A wire 11 is drawn out from an end of the RF wiring that is connected to one end of the terminating resistor 6 of the RF wiring board 20 integrating the terminating resistor 6 and connected to an electrode of an EA modulator 5, and supplies a modulated electric signal to the EA modulator 5. A wire 12 is drawn out from an electrode connected to another end of the terminating resistor 6 integrated on the RF wiring board 20 and connected to an end of the capacitor 7 for DC interruption (DC cut) across the EA-DFB laser chip 3. Another end of the capacitor 7 is connected to and grounded by the ground pad 8. As shown in FIG. 2, in the optical transmitter according to the first embodiment, a width of the subcarrier 1 can be reduced by an amount corresponding to lengths of the terminating resistor 6 integrated on the RF wiring board 20 and the electrodes to 0.75 mm.

For comparison, an optical transmitter subassembly was created using the same EA-DFB laser chip 3 by applying a conventional structure. This is a structure as shown in FIG. 1.

Figure 3:
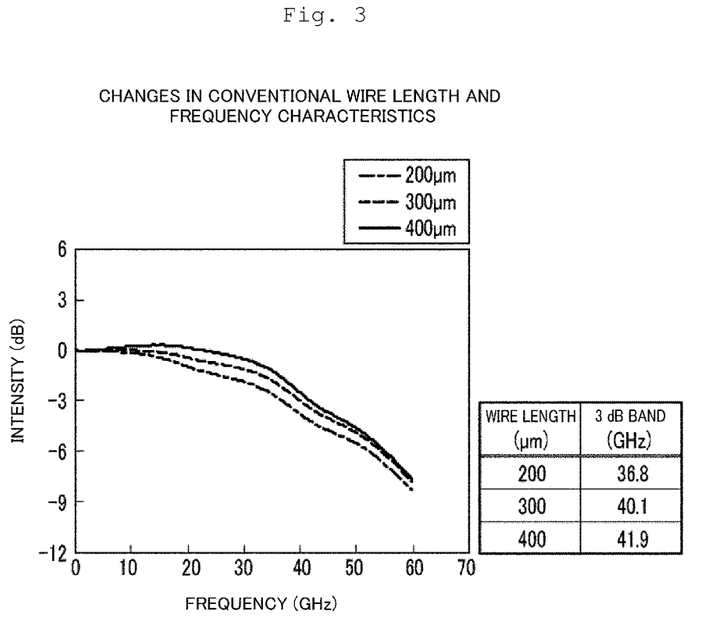
FIG. 3 is a diagram showing a change in frequency response characteristics when changing a wire length in conventional art.
Figure 4:
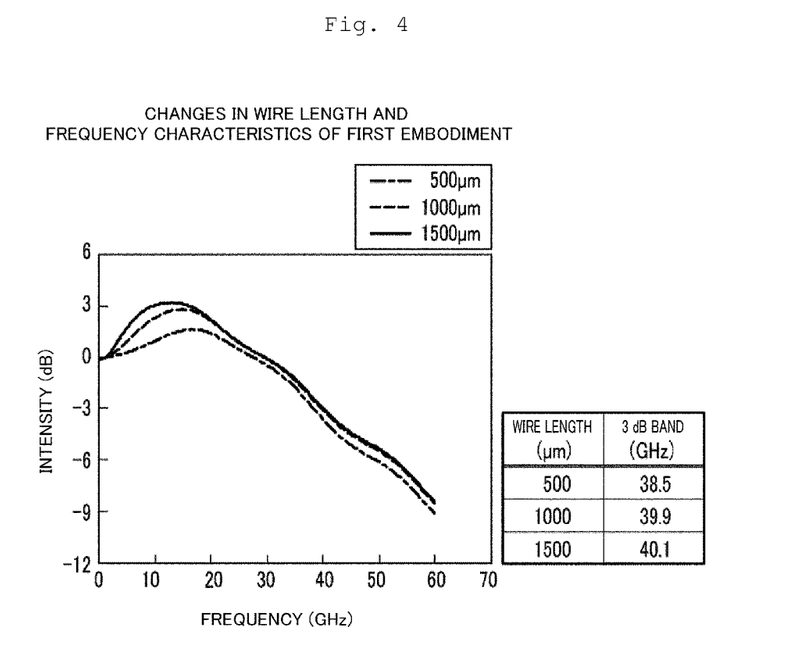
FIG. 4 is a diagram showing a change in frequency response characteristics when changing a wire length in the first embodiment of the present invention.

FIGS. 3 and 4 show changes in frequency response characteristics of the respective created optical transmitter subassemblies obtained by changing the wire length in three different ways. FIG. 3 represents a case of the conventional example and FIG. 4 represents a case of the first embodiment of the present invention. Values of frequencies in the 3 dB band that correspond to the three different wire lengths of each wire (in FIG. 3, the wire 10 shown in FIG. 1, and in FIG. 4, the wire 12 shown in FIG. 2) are also shown in tables provided in lower right parts of FIGS. 3 and 4. EA lengths of both wires are set to 130 µm, a resistance value of the terminating resistor is set to 50Ω, a length of the wire 11 connecting the EA modulator and the RF wiring board to each other is set to 220 µm, and a capacity of the capacitor is set to 0.1 µF.

The frequency response characteristics of the optical transmitter when conventional art is applied are as shown in FIG. 3, and the frequency response characteristics when the first embodiment of the present invention is applied are as shown in FIG. 4. The three graphs of frequency response characteristics represent changes when lengths of the wires 10 and 12 shown in FIGS. 1 and 2 are changed in three different ways.

When conventional art is applied (FIGS. 1 and 3), with respect to a design value 300 µm of the wire 10, the 3 dB band at the time of the design value is 40.1 GHz, and a wire length fluctuation of ±100 µm results in a maximum fluctuation of the 3 dB band of around 3.3 GHz. In contrast, when the first embodiment of the present invention is applied (FIGS. 2 and 4), with respect to a design value 1000 µm of the wire 12, the 3 dB band at the time of the design value is 39.9 GHz which means that a band almost comparable to conventional art is obtained and, at the same time, even a wire length fluctuation of ±500 µm results in only a maximum fluctuation of the 3 dB band of around 1.4 GHz. This result indicates that, compared to the conventional structure, the structure according to the first embodiment has extremely large tolerance with respect to a fluctuation in the length of a wire.

In addition, it is confirmed that, even when comparing widths of the created subassemblies, with respect to 0.95 mm for the conventional type, the width in the structure according to the first embodiment is 0.75 mm, which represents a reduction in width by 0.2 mm.

Second Embodiment

Figure 5:
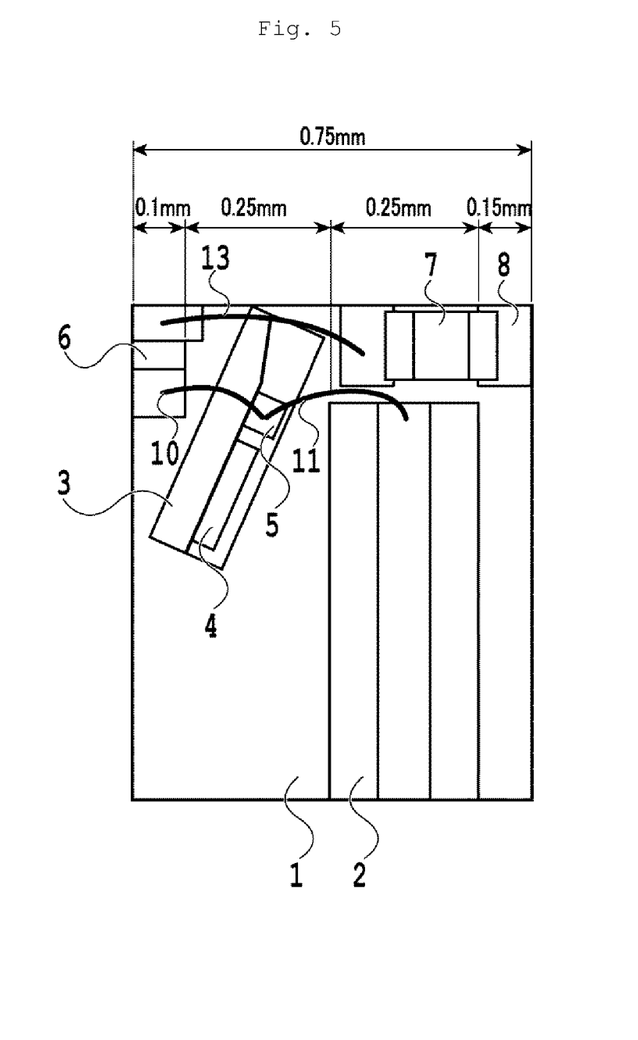
FIG. 5 is a plan view of a module of an optical transmitter according to a second embodiment of the present invention.

FIG. 5 is a plan view of an optical transmitter according to a second embodiment of the present invention. In the optical transmitter according to the second embodiment of the present invention, using the same EA-DFB laser chip 3 as the first embodiment, a subcarrier is created using a component in which the terminating resistor 6 is integrated on the subcarrier 1 unlike in the first embodiment.

In the optical transmitter subassembly according to the second embodiment shown in FIG. 5, the capacitor 7 for DC interruption (DC cut) is also integrated on the subcarrier 1. However, unlike both the first embodiment and the conventional example, the capacitor 7 is positioned on a side of the RF wiring board 2 which is an opposite side to the terminating resistor 6 with the EA-DFB laser chip 3 therebetween and provided in an orientation so as to have an end electrode in a width direction of an RF wiring as a separate part to the RF wiring board 2.

An end electrode on a right side of the capacitor 7 is connected to and grounded by the ground pad 8 positioned in an upper right corner of the subcarrier 1, and an end electrode on a left side of the capacitor 7 is drawn out by a wire 13 and connected to one end of the terminating resistor 6 across the EA-DFB laser chip 3.

The terminating resistor 6 is arranged in an orientation which causes end electrodes to be positioned above and below unlike in the conventional example, another end of the terminating resistor 6 is connected to the electrode of the EA modulator 5 by the wire 10 in a similar manner to the conventional example, and the electrode of the EA modulator 5 is supplied with a modulated electric signal by the wire 11 from an upper end of the RF wiring.

Figure 6:
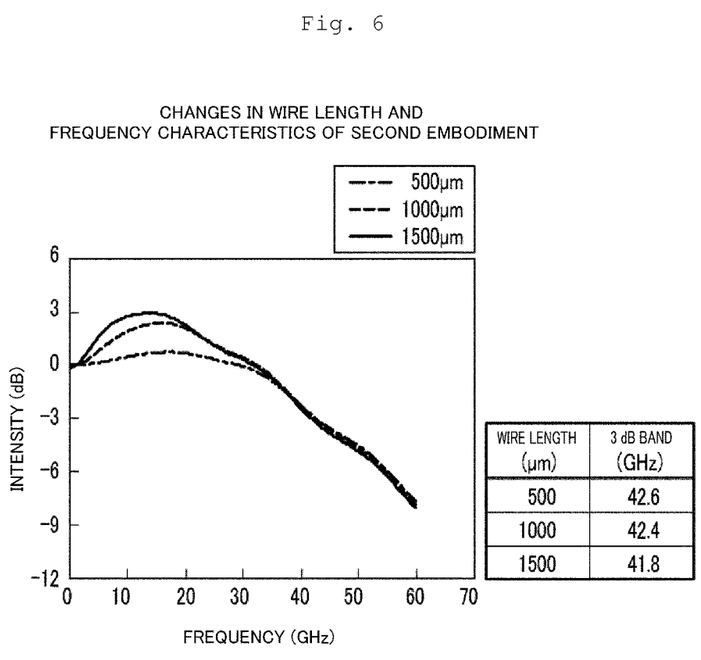
FIG. 6 is a diagram showing a change in frequency response characteristics when changing a wire length in the second embodiment of the present invention.

FIG. 6 shows fluctuations of frequency response characteristics with respect to a sum of the wire 13 and the wires 10 and 11 (a sum of lengths of wires on an electric path which starts at the RF wiring board, passes through the terminating resistor, and reaches the ground pad) of the created optical transmitter subassembly according to the second embodiment. When the sum of the lengths of the wires is a design value, the 3 dB band is 42.4 GHz, thereby enabling a band improvement of around 2 GHz as compared to the 3 dB band according to the conventional structure to be confirmed. In addition, even when there is a wire length fluctuation of ±500 µm, the 3 dB band only fluctuates by around 0.8 GHz at a maximum. This result indicates that, compared to the conventional structure, the structure according to the second embodiment has extremely large tolerance for fluctuations in the length of a wire.

In addition, it is confirmed that, even when comparing widths of the created subassemblies, with respect to 0.95 mm for the conventional type, the width in the structure according to the second embodiment is 0.75 mm, which represents a reduction in the width by 0.2 mm. This is also attributable to the fact that it is possible to absorb a relatively small width of the terminating resistor 6 by an open area in an upper left corner of the EA-DFB laser chip 3 having been obliquely arranged.

Moreover, since the capacitor 7 for DC cut need only interrupt DC voltage that is applied to the EA modulator 5 on an electric path which starts at the RF wiring board 2, passes through the terminating resistor 6, and reaches the ground pad 8, at least one capacitor need only be connected in series as a circuit on the electric path. In addition, the terminating resistor 6 may be the terminating resistor 6 having been monolithically integrated on the subcarrier 1.

While both embodiments adopt the EA-DFB laser chip 3 as a laser chip in the present invention, it is obvious that the laser chip is not limited thereto and may be a modulated laser chip having an optical modulation function.

INDUSTRIAL APPLICABILITY

As described above, with the optical transmitter according to the present invention, an optical transmitter capable of significantly suppressing a fluctuation in frequency response characteristics due to a fabrication error in internal wire length while reducing a subcarrier size of a module can be provided.

REFERENCE SIGNS LIST

1 Subcarrier
2, 20 RF wiring board
3 EA-DFB laser chip
4 DFB laser
5 EA modulator
6 Terminating resistor
7 Capacitor
8 Ground pad
10, 11, 12, 13 Wire

The invention claimed is:
1. An optical transmitter, comprising:
a subcarrier;
an RF wiring board with wires and mounted on the subcarrier;
a modulated laser chip mounted on the subcarrier;
a terminating resistor mounted on the subcarrier;
a ground pad on an upper surface of the subcarrier; and
the wires electrically connecting at least a part of an electric path, the electric path extending from the RF wiring board to the ground pad and passing through the terminating resistor;
wherein:
an output optical waveguide of the modulated laser chip emits light at an angle of not 90 degrees to an emitting end face of the modulated laser chip;
the RF wiring board and the ground pad are arranged to sandwich the modulated laser chip in a width direction of the subcarrier,
the terminating resistor is a termination of an RF wiring and integrated on the RF wiring board and a width of the terminating resistor is approximately the same as a width of the RF wiring on the RF wiring board; and
a length of the wires in the electric path extending to the ground pad ranges from 0.5 to 1.5 mm or an inductance of the wires ranges from 0.4 to 1.2 nH.

2. The optical transmitter according to claim 1, further comprising at least one capacitor connected in series as a circuit to the electric path from the RF wiring board to the ground pad.

3. The optical transmitter according to claim 2, wherein the capacitor is arranged on an opposite side to the terminating resistor with the modulated laser chip therebetween.

4. An optical transmitter, comprising:
a subcarrier;
an RF wiring board mounted on the subcarrier;
a modulated laser chip mounted on the subcarrier;
a terminating resistor mounted on the subcarrier;
a ground pad on an upper surface of the subcarrier;
a capacitor on the upper surface of the subcarrier; and
wires for electrically connecting at least a part of an electric path from the RF wiring board, reaching the ground pad through the terminating resistor, wherein:
an output optical waveguide of the modulated laser chip emits light at an angle of not 90 degrees to an emitting end face of the modulated laser chip;
the terminating resistor is integrated on the subcarrier with the RF wiring board and the terminating resistor is arranged to sandwich the modulated laser chip in a width direction of the subcarrier;
the ground pad is in an upper corner of the subcarrier on a same side of the modulated laser chip as the RF wiring board,
the capacitor is arranged on an opposite side of the subcarrier to the terminating resistor with the modulated laser chip therebetween,
a first electrode of the capacitor is connected directly to the terminating resistor by one of the wires, and a second electrode of the capacitor is connected to the ground pad,
a length of the wires in the electric path to the ground pad ranges from 0.5 to 1.5 mm or an inductance of the wires ranges from 0.4 to 1.2 nH.

* * * * *